United States Patent
Zhang et al.

(10) Patent No.: US 10,782,000 B2
(45) Date of Patent: Sep. 22, 2020

(54) BACKLIGHT AND METHOD FOR MANUFACTURING THE SAME, DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shubai Zhang, Beijing (CN); Haiwei Sun, Beijing (CN); Ming Zhai, Beijing (CN); Yutao Hao, Beijing (CN); Yuanda Lu, Beijing (CN); Zhen Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/238,671

(22) Filed: Jan. 3, 2019

(65) Prior Publication Data
US 2019/0346113 A1    Nov. 14, 2019

(30) Foreign Application Priority Data

May 8, 2018   (CN) .......................... 2018 1 0431170

(51) Int. Cl.
  *G02F 1/1335*  (2006.01)
  *F21V 13/14*   (2006.01)
  *F21V 9/20*    (2018.01)
  *F21V 9/32*    (2018.01)
  (Continued)

(52) U.S. Cl.
  CPC ............... *F21V 13/14* (2013.01); *F21V 9/20* (2018.02); *F21V 9/32* (2018.02); *F21Y 2105/12* (2016.08); *F21Y 2115/10* (2016.08)

(58) Field of Classification Search
  CPC ... F21V 9/20; F21V 9/32; F21V 13/14; G02F 1/133606; G02F 2001/133614
  See application file for complete search history.

(56) References Cited

U.S. PATENT DOCUMENTS 9,746,157 B2 *   8/2017  Ninan ....................... G02B 5/22
9,810,942 B2 * 11/2017  You ................... G02F 1/133609
(Continued)

*Primary Examiner* — Arman B Fallahkhair
(74) *Attorney, Agent, or Firm* — Nath, Goldberg & Meyer; Joshua B. Goldberg; Stephanie F. Majkut

(57) ABSTRACT

The present application provides a backlight, a method for manufacturing a backlight, and a display apparatus. The backlight includes at least one lamp plate having a base substrate and a light source on the base substrate, the light source being configured to emit light having a first wavelength; a wavelength selection layer on a side of the light source away from the base substrate; and a wavelength conversion layer on a side of the wavelength selection layer away from the base substrate. The wavelength conversion layer is configured to emit light having a second wavelength under excitation of the light having the first wavelength. The wavelength selection layer is configured to transmit the light having the first wavelength through the wavelength selection layer and reflect the light having the second wavelength.

17 Claims, 3 Drawing Sheets

(51) Int. Cl.
*F21Y 105/12* (2016.01)
*F21Y 115/10* (2016.01)

(56) References Cited

U.S. PATENT DOCUMENTS

| | | | |
|---|---|---|---|
| 2005/0052859 A1* | 3/2005 | Lazarev | C09K 19/3441 362/600 |
| 2007/0236628 A1* | 10/2007 | Epstein | G02B 5/0242 349/67 |
| 2009/0180055 A1* | 7/2009 | Kim | G02F 1/133603 349/69 |
| 2013/0050293 A1* | 2/2013 | Feng | G09G 3/3413 345/690 |
| 2013/0258634 A1* | 10/2013 | Xu | G02B 5/0231 362/19 |

\* cited by examiner

US 10,782,000 B2

BACKLIGHT AND METHOD FOR MANUFACTURING THE SAME, DISPLAY APPARATUS

CROSS-REFERENCE TO RELATED APPLICATION

This application claims priority to Chinese Patent Application No. 201810431170.3, filed on May 8, 2018, the entire contents of which are hereby incorporated by reference.

TECHNICAL FIELD

The present disclosure relates to the field of display technology, and particularly, to a backlight, a method for manufacturing a backlight, and a display apparatus.

BACKGROUND

In recent years, miniaturized electro-optics devices, such as mini light emitting diodes (mini LEDs) and micro light emitting diodes (micro LEDs), are proposed and developed. The mini or micro LED-based display panels have the advantages of high brightness, high contrast ratio, fast response, and low power consumption. The mini or micro LED-based display technology has found a wide range of applications in the display field.

SUMMARY

In an aspect, the present disclosure provides a backlight including at least one lamp plate having a base substrate and a light source on the base substrate, the light source being configured to emit light having a first wavelength; a wavelength selection layer on a side of the light source away from the base substrate; and a wavelength conversion layer on a side of the wavelength selection layer away from the base substrate. The wavelength conversion layer is configured to emit light having a second wavelength under excitation of the light having the first wavelength. The wavelength selection layer is configured to transmit the light having the first wavelength through the wavelength selection layer and reflect the light having the second wavelength.

In some embodiments, the wavelength conversion layer is directly on and in contact with the wavelength selection layer.

In some embodiments, the light having the first wavelength includes blue light; and the light having the second wavelength includes red light and/or green light.

In some embodiments, the first wavelength is in a range of approximately 320 nm to approximately 480 nm; and the second wavelength is in a range of approximately 480 nm to approximately 800 nm.

In some embodiments, the wavelength conversion layer includes a quantum dot or a fluorophor.

In some embodiments, the backlight further includes a first prism layer on a side of the wavelength conversion layer away from the base substrate and configured to collimate light entering the first prism layer.

In some embodiments, the at least one lamp plate further includes a reflective layer on the base substrate and having an opening in a one-to-one correspondence with the light source, and the reflective layer is nested on a layer where the light source is located through the opening of the reflective layer.

In some embodiments, an orthographic projection of the light source on the base substrate overlaps an orthographic projection of the opening on the base substrate.

In some embodiments, the at least one lamp plate is a plurality of lamp plates, and the plurality of lamp plates are arranged as a surface light source. The plurality of lamp plates share the wavelength selection layer.

In some embodiments, the plurality of lamp plates share the wavelength conversion layer and the first prism layer.

In some embodiments, the backlight further includes a diffuser layer and a second prism layer between the light source and the wavelength selection layer. The diffuser layer is on a side of the light source away from the base substrate and configured to diffuse light having a predetermined color emitted from the light source. The second prism layer is on a side of the diffuser layer away from the base substrate, and configured to collimate the light having the predetermined color passing through the diffuser layer.

In some embodiments, an extending direction of a ridge of the first prism layer is orthogonal to an extending direction of a ridge of the second prism layer.

In some embodiments, the light source is a mini light emitting diode, and the light having the first wavelength is blue light.

In another aspect, the present disclosure further provides a display apparatus including the backlight described herein or manufactured by a method described herein.

In another aspect, the present disclosure further provides a method for manufacturing a backlight including forming a base substrate and forming a light source on the base substrate, thereby forming a lamp plate, the light source being formed to emit light having a first wavelength; forming a wavelength selection layer on a side of the light source away from the base substrate; and forming a wavelength conversion layer on a side of the wavelength selection layer away from the base substrate. The wavelength conversion layer is formed to emit light having a second wavelength under excitation of the light having the first wavelength. The wavelength selection layer is formed to transmit the light having the first wavelength through the wavelength selection layer and reflect the light having the second wavelength.

In some embodiments, the wavelength conversion layer is directly formed on the wavelength selection layer and formed to be in contact with the wavelength selection layer.

In some embodiments, the first wavelength is in a range of approximately 320 nm to approximately 480 nm; and the second wavelength is in a range of approximately 480 nm to approximately 800 nm.

In some embodiments, the wavelength conversion layer is formed to include a quantum dot or a fluorophor.

In some embodiments, the method further includes forming a plurality of lamp plates, and arranging the plurality of lamp plates to form a surface light source, the wavelength selection layers for the plurality of lamp plates being integrally formed.

DETAILED DESCRIPTION

To make those skilled in the art better understand the technical solutions of the present disclosure, the present disclosure will be described in detail below in conjunction with the accompanying drawings and specific embodiments.

Compared to normal images, HDR (High-Dynamic Range) images can have more dynamic ranges and image details. The self-emission characteristic of the OLED (Organic Light Emitting Diode) devices can give excellent HDR experience. However, the OLED devices have a lower product yield and lack a self-repair function for defective pixel, so the manufacturing cost and the repair cost are relatively expensive.

In the related art, it has been proposed to display HDR effect by using a LCD (Liquid Crystal Display). In this scheme, a light source with regional light emission function is required, such as the backlight having micro LED or mini LED. In consideration of manufacturing process and cost, the mini LED having a relatively large chip volume has larger market prospect. The mini LED has a larger chip volume, so that light emission area thereof is larger and central luminance thereof is higher. However, the backlight has a very complex optical design, and almost 50% of light will be reflected back to pass through films, diffuser plate and LED base substrate. The LED base substrate has a large area occupied by the chip, which has a low reflectivity, so that the light loss is high. Moreover, due to the limitation of reflow soldering process, a white ink layer is normally used as the reflective layer of the lamp plate in the backlight, and the maximum reflectivity of the white ink layer is approximately 85%, resulting in further light loss. Further, under a same power consumption condition, luminance of the mini LED is lower than (e.g., 65% of) that of a light source of a normal edge-type backlight, resulting in that the luminance of the backlight having the mini LED is relatively low.

Figure 1:
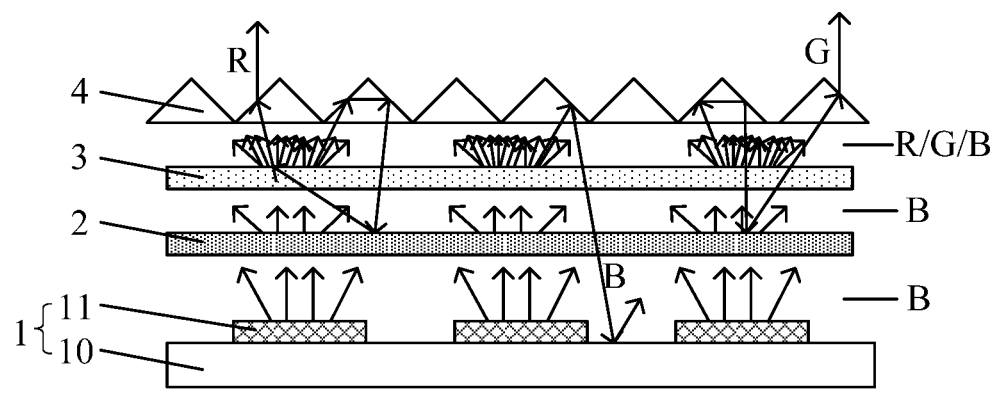
FIG. 1 is a schematic diagram illustrating a structure of a backlight in some embodiments according to the present disclosure.

Accordingly, the present disclosure provides, inter alia, a backlight, a method for manufacturing a backlight, and a display apparatus that substantially obviate one or more of the problems due to limitations and disadvantages of the related art. In an aspect, the present disclosure provides a backlight. FIG. 1 is a schematic diagram illustrating a structure of a backlight in some embodiments according to the present disclosure. Referring to FIG. 1, in some embodiments, the backlight includes at least one lamp plate 1 having a base substrate 10 and a light source 11 on the base substrate 10; a wavelength selection layer 2 on a side of the light source 11 away from the base substrate 10 (i.e., on a light exiting side of the light source); and a wavelength conversion layer 3 on a side of the wavelength selection layer 2 away from the base substrate 10. In some embodiments, the light source 11 is configured to emit light having a first wavelength. In some embodiments, the wavelength conversion layer 3 is configured to emit light having a second wavelength under excitation of the light having the first wavelength. In some embodiments, the wavelength selection layer 2 is configured to transmit the light having the first wavelength through the wavelength selection layer 2 and reflect the light having the second wavelength. In some embodiments, the light source 11 is a mini LED. In one example, the light source 11 is a mini LED emitting blue light. In one example, each of the wavelength selection layer 2 and the wavelength conversion layer 3 may be in the form of a film.

Depending on the relationship between the reflectivity difference of a surface of the wavelength selection layer 2 contacting light and the wavelength of the light, the wavelength selection layer 2 can allow the light having the first wavelength to pass therethrough and reflect the light having the second wavelength. In the present disclosure, different wavelength selection layers 2 may be selected depending on actual situations to adjust the light intensity and spectrum of the light having the first wavelength, thereby adjusting color points of the backlight, which in turn lowers the cost of adjusting color points of the wavelength conversion layer 3. In particular, when a quantum dot layer (e.g., quantum dot film) is used as the wavelength conversion layer 3, the cost of adjusting color points of the quantum dot layer is relatively high.

In the present disclosure, by additionally providing the wavelength selection layer 2 that is capable of transmitting the light having the first wavelength through and reflecting the light having the second wavelength, it is possible to increase luminance of the present backlight. For example, the wavelength selection layer 2 transmits the light having the first wavelength emitted from the light source 11 to the wavelength conversion layer 3; then, the wavelength conversion layer 3 emits light having the second wavelength under the excitation of the light having the first wavelength. At this time, even if the light having the second wavelength irradiates onto and is reflected by another film on a light exiting side of the wavelength conversion layer 3 (i.e., a side of the wavelength conversion layer 3 away from the wavelength selection layer 2) and reaches the wavelength selection layer 2 again, the light having the second wavelength is reflected by the wavelength selection layer 2. This process continues until the light having the second wavelength exits from the present backlight. In this manner, the light loss of the light having the second wavelength is very small, thereby increasing luminance of the backlight.

In some embodiments, the first wavelength is in a range of approximately 320 nm to approximately 480 nm. In some embodiments, the second wavelength is in a range of approximately 480 nm to approximately 800 nm. In some embodiments, the light having the first wavelength includes blue light; and the light having the second wavelength includes red light and/or green light. In the following descriptions, an example will be given in which the light having the first wavelength includes blue light and the light having the second wavelength includes red light and green light.

Various appropriate materials may be used for making the wavelength conversion layer 3. Examples of appropriate materials for making the wavelength conversion layer 3 may include a quantum dot or a fluorophor.

In some embodiments, the backlight further includes a first prism layer 4 on a side of the wavelength conversion layer 3 away from the base substrate 10 and configured to collimate light entering the first prism layer 4. That is, light exiting from the first prism layer 4 is collimated light.

For example, as illustrated in FIG. 1, the light source 11 on the base substrate 10 emits blue (B) light, and the blue light transmits through the wavelength selection layer 2 and irradiates onto the wavelength conversion layer 3 (e.g., a quantum dot layer). The quantum dot layer may be provided therein with a red quantum dot and a green quantum dot. In this case, under the excitation of the blue light, the red quantum dot in the quantum dot layer emits red (R) light, and the green quantum dot in the quantum dot layer emits green (G) light. Also, a portion of the blue light directly exits from the quantum dot layer (i.e., exits from a side of the quantum dot layer away from the wavelength selection layer 2). In this process, the light exiting from the quantum dot layer includes red light, green light and blue light, which are mixed into white light. After that, the white light irradiates onto the first prism layer 4. Portions of red light, green light and blue light in the white light irradiating onto the first prism layer 4 are collimated and emitted out. The collimated and emitted light remains as mixed white light. Meanwhile, other portions of red light, green light and blue light in the white light irradiating onto the first prism layer 4 are reflected and then transmit through the quantum dot layer to irradiate onto the wavelength selection layer 2. Because the wavelength selection layer 2 allows the blue light to transmit therethrough and reflects the red light and the green light, the wavelength selection layer 2 reflects the red light and the green light irradiating thereon. This process continues, until the red light and the green light also exit from the first prism layer 4, so as to avoid loss of the red light and the green light, thereby increasing the luminance of the backlight. For the blue light, it transmits through the wavelength selection layer 2 to reach and be reflected by the base substrate 10, until it exits from the first prism layer 4.

Figure 2:
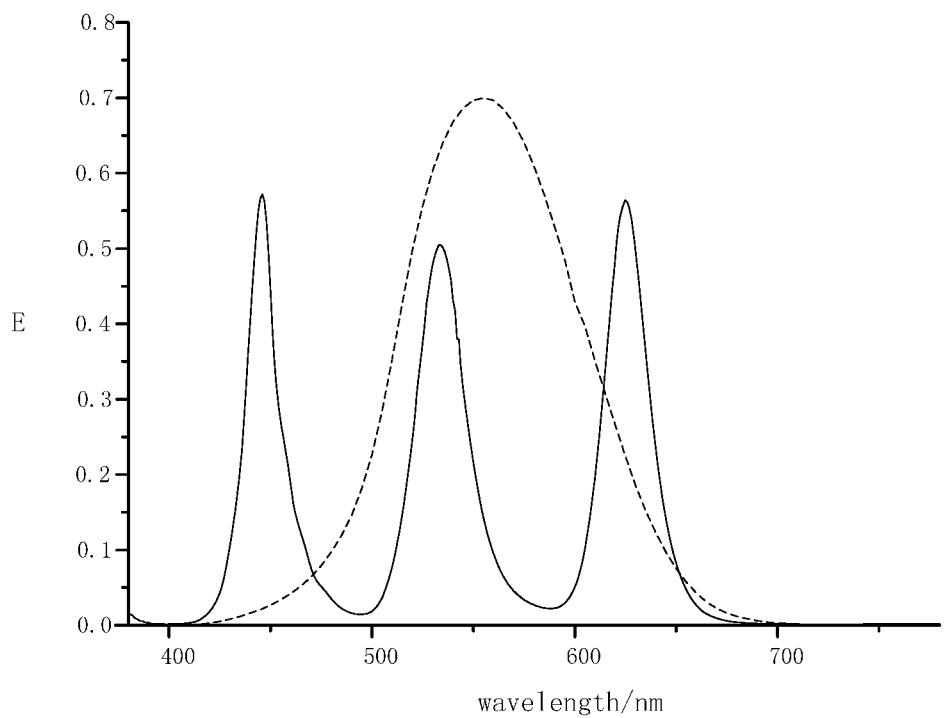
FIG. 2 is a graph illustrating a spectrum of a quantum dot layer and CIE1931 standard chromaticity observer in some embodiments according to the present disclosure.

According to the present disclosure, by lowering the loss of the red light and the green light, the luminance of the backlight can be significantly increased. FIG. 2 is a graph illustrating a spectrum of a quantum dot layer and CIE1931 standard chromaticity observer in some embodiments according to the present disclosure. As illustrated in FIG. 2, the plot depicted by the solid line is a spectrum of light from the color filter after blue light excites quantum dots (i.e., a spectrum of the quantum dot layer), the plot depicted by the dotted line is a visibility function diagram of human eyes (i.e., CIE1931 standard chromaticity observer diagram), and E denotes energy level for representing a relative magnitude of energy. From the visibility function diagram of human eyes, it can be seen that human eyes are most sensitive to light having a wavelength between 500 nm to 620 nm. That is to say, the more the proportion of the wavelength between 500 nm to 620 nm in the spectrum of the exiting light, the higher the luminance. Thus, improving utilization of red light and green light contributes a lot to the luminance.

Figure 3:
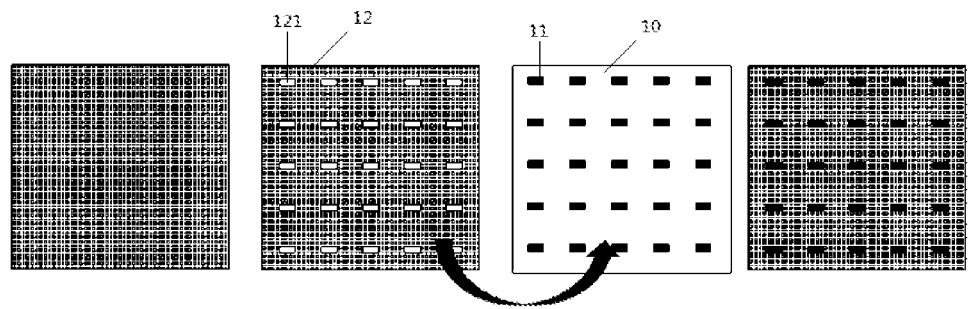
FIG. 3 is a schematic diagram illustrating assembly of a reflective layer and light sources in some embodiments according to the present disclosure.

FIG. 3 is a schematic diagram illustrating assembly of a reflective layer and light sources in some embodiments according to the present disclosure. As illustrated in FIG. 3, in some embodiments, the lamp plate 1 further includes a reflective layer 12 on the base substrate 10. The reflective layer 12 may be provided therein with openings 121 well-matched with the light sources 11. For example, the openings 121 are arranged in a one-to-one correspondence with the light sources 11. The reflective layer 12 is nested on a layer where the light sources 11 are located through the openings 121 of the reflective layer 12. That is to say, the openings 121 are first provided in the reflective layer 12, and then the reflective layer 12 having the openings 121 is nested on the layer where the light sources 11 are located. This arrangement can avoid such a problem: in a case where the reflective layer is first attached to the lamp plate 1, then openings 121 are formed through a laser positioning process, and the light sources 11 are provided in the openings 121 through a screen printing process using a soldering material, the reflective layer may be melted and folded and thus damaged, due to the high temperature in the reflow soldering process. In some embodiments, an orthographic projection of the opening 121 on the base substrate overlaps an orthographic projection of the light source 11 on the base substrate 10. In some embodiments, an orthographic projection of the opening 121 on the base substrate covers an orthographic projection of the light source 11 on the base substrate 10. In some embodiments, an orthographic projection of reflective layer 12 on the base substrate does not overlap an orthographic projection of the light source 11 on the base substrate 10, so that the light source 11 can be provided within a corresponding opening 121.

Various appropriate materials may be used for making the reflective layer 12. Examples of appropriate materials for making the reflective layer 12 may include but are not limited to white ink. In some embodiments, a protection layer (not shown in figures) covering the light source 11 and the reflective layer 12 may be formed on the reflective layer 12, to prevent the light source 11 from being scratched when forming a subsequent layer. Various appropriate materials may be used for making the protection layer. Examples of appropriate materials for making the protection layer may include but are not limited to protection glue. In some embodiments, the wavelength selection layer 2 may be attached to the light source 11 through the protection glue, thereby improving reliability.

In some embodiments, the wavelength conversion layer 3 may be on (e.g., directly on) and in contact with the wavelength selection layer 2. In this manner, the wavelength selection layer 2 can function as a protection layer for the wavelength conversion layer 3, while an entirety of the backlight is made lighter and thinner.

Figure 4:
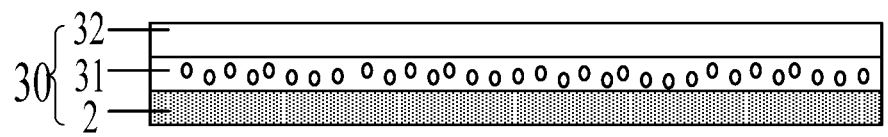
FIG. 4 is a schematic diagram illustrating a quantum dot layer including a wavelength selection layer in some embodiments according to the present disclosure.

Next, descriptions will be given by taking a case where the wavelength conversion layer 3 is a quantum dot layer as an example. Generally, the quantum dot layer has a structure of two transparent base layers with a layer of quantum dots interposed therebetween. In the present disclosure, however, one of the two transparent base layers may be omitted and the wavelength selection layer 2 can be used for replacing the omitted transparent base layer. FIG. 4 is a schematic diagram illustrating a quantum dot layer including a wavelength selection layer in some embodiments according to the present disclosure. As illustrated in FIG. 4, the quantum dot layer 30 may be constituted of one transparent base layer 32, the wavelength selection layer 2, and a layer 31 of quantum dots interposed between the transparent base layer 32 and the wavelength selection layer 2. In some embodiments, the transparent base layer may not be omitted in the quantum dot layer 30, and in this case, the layer 31 of quantum dots may be fixed with the wavelength selection layer 2 together through the transparent base layer that has not been omitted.

Various appropriate materials may be used for making the transparent base layer. Examples of appropriate materials for making the transparent base layer may include but are not limited to PET (plastic) material. In some embodiments, each of the transparent base layer and the wavelength selection layer 2 has a thickness of approximately 25 nm to approximately 200 nm.

Figure 5:
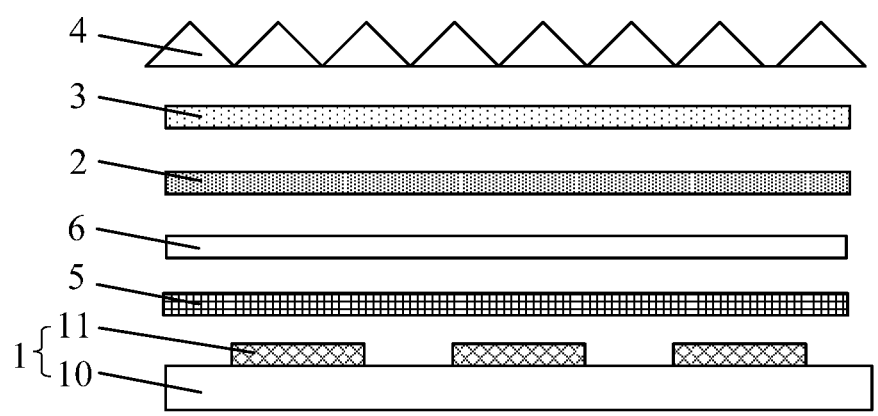
FIG. 5 is a schematic diagram illustrating another structure of a backlight in some embodiments according to the present disclosure.

FIG. 5 is a schematic diagram illustrating another structure of a backlight in some embodiments according to the present disclosure. The backlight shown in FIG. 5 has substantially the same structure as that of the backlight shown in FIG. 1 except that the backlight in FIG. 5 further includes a diffuser layer 5 and a second prism layer 6 sequentially arranged between the light source 11 and the wavelength selection layer 2. The diffuser layer 5 is provided on a side of the light source 11 away from the base substrate 10 and configured to diffuse light having a predetermined color (e.g., blue light) emitted from the light source 11 so that the light is diffused and uniformly distributed. The diffuser layer 5 may be a layer having a rough surface. The second prism layer 6 is provided on a side of the diffuser layer 5 away from the base substrate 10 and configured to collimate the diffused light having the first wavelength (e.g., blue light) so that the light can directly exit from the wavelength selection layer 2. The second prism layer 6 and the first prism layer 4 may have a same structure, but directions of arrangement thereof have a difference of 90°. That is, an extending direction of a ridge of the first prism layer is orthogonal to an extending direction of a ridge of the second prism layer.

Figure 6:
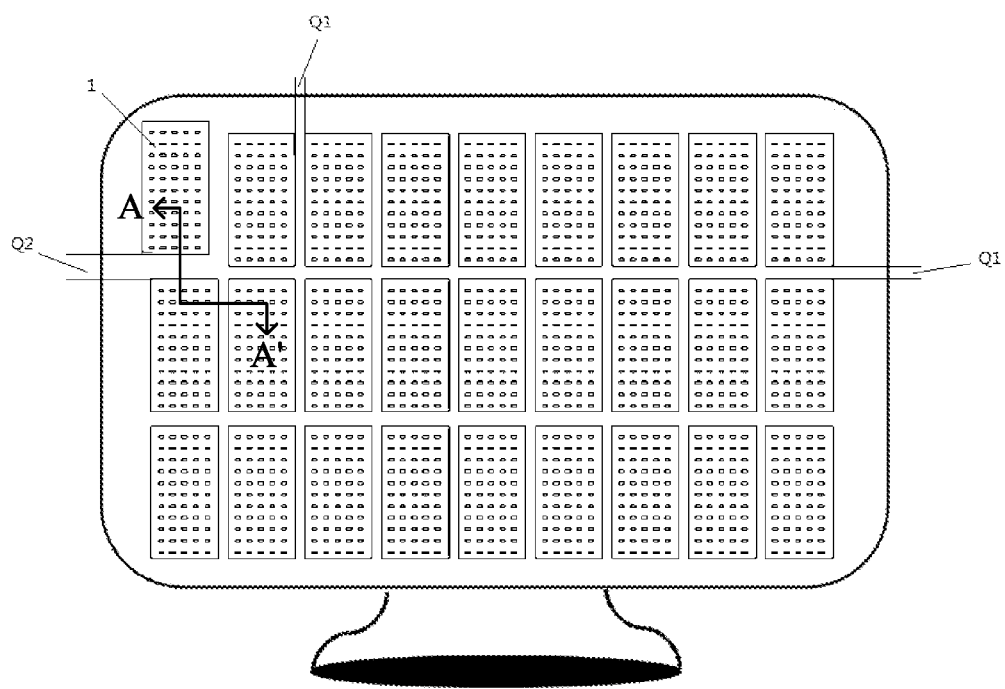
FIG. 6 is a plan view illustrating an arrangement of a plurality of lamp plates in a backlight in some embodiments according to the present disclosure.
Figure 7:
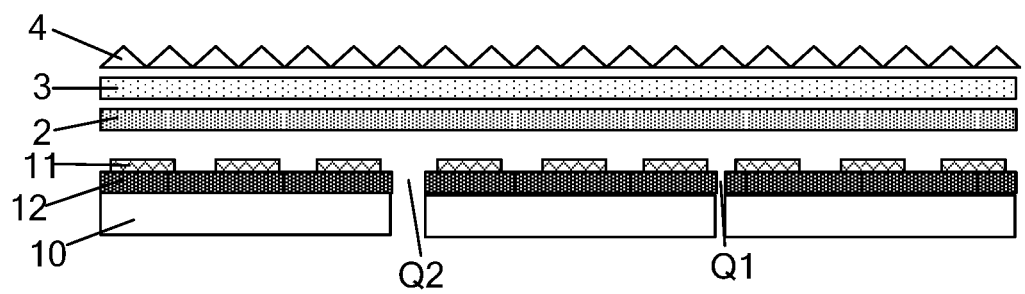
FIG. 7 is a cross-sectional view taken along line A-A' in FIG. 6.

FIG. 6 is a plan view illustrating an arrangement of a plurality of lamp plates in a backlight in some embodiments according to the present disclosure. FIG. 7 is a cross-sectional view taken along line A-A' in FIG. 6.

In some embodiments, the backlight may include a plurality of lamp plates, thereby providing a light source for a large size panel. Referring to FIGS. 6 and 7, the backlight includes a plurality of lamp plates 1, and the plurality of lamp plates 1 are arranged in rows and columns, thereby forming a surface light source (e.g., one surface light source). In some embodiments, the plurality of lamp plates may be arranged in one row or one column, or may be arranged in other manners, thereby forming a surface light source. When the plurality of lamp plates 1 are arranged to form a surface light source, a gap may exist between adjacent lamp plates 1 due to limitations of manufacturing process and assembly tolerance. The gap includes a gap Q1 due to the process and a gap Q2 due to the assembly tolerance. It is difficult to re-manufacture the reflective layer in the gap, and thus the light irradiating into the gap cannot be reflected and exit from the display panel, resulting in that a dark strip occurs on the display panel, thereby affecting the display effect. Moreover, reflectivity of the reflective layer (e.g., white ink layer) among lamp plates may be different due to difference of process of each lamp plate, resulting in that light finally emitted from each lamp plate is different, thereby generating uneven luminance.

Accordingly, in some embodiments, the wavelength selection layers 2 for the lamp plates 1 are of an integral structure. That is, the lamp plates 1 share the wavelength selection layer 2. Because the wavelength selection layer 2 is of an integral structure, it can cover the gap. Therefore, the red light and the green light, which contribute more to the luminance, can be reflected on a side of the wavelength selection layer 2 away from the light source 11 rather than on the lamp plates, thereby avoiding the problems of dark strip and luminance difference of the lamp plates due to the presence of the gap. In some embodiments, the wavelength conversion layers 3 and the first prism layers 4 for the lamp plates in the backlight may also be of integral structures, as illustrated in FIG. 7. As such, the manufacturing process can be facilitated while the cost can be lowered.

In another aspect, the present disclosure further provides a display apparatus, including the backlight described herein or manufactured by a method described herein. Since the display apparatus includes the backlight, the luminance of the display apparatus can be greatly increased.

The display apparatus may be any products or parts having display function, such as a liquid crystal panel, an electronic paper, a mobile phone, a tablet computer, a television, a display, a laptop computer, a digital photo frame, a navigator or the like.

In another aspect, the present disclosure further provides a method for manufacturing a backlight. In some embodiments and referring to FIG. 1, the method includes forming a base substrate 10 and forming a light source 11 configured to emit light having a first wavelength on the base substrate 10, thereby forming a lamp plate 1; forming a wavelength selection layer 2 on a side of the light source 11 away from the base substrate 10; and forming a wavelength conversion layer 3 on a side of the wavelength selection layer 2 away from the base substrate 10. In some embodiments, the wavelength conversion layer is formed to emit light having a second wavelength under excitation of the light having the first wavelength. In some embodiments, the wavelength selection layer is formed to transmit the light having the first wavelength through the wavelength selection layer and reflect the light having the second wavelength.

In some embodiments, the wavelength conversion layer is directly formed on the wavelength selection layer and formed to be in contact with the wavelength selection layer.

In some embodiments, the light having the first wavelength includes blue light; and the light having the second wavelength includes red light and/or green light. In some embodiments, the first wavelength is in a range of approximately 320 nm to approximately 480 nm; and the second wavelength is in a range of approximately 480 nm to approximately 800 nm. In some embodiments, the wavelength conversion layer is formed to include a quantum dot or a fluorophor.

In some embodiments and referring to FIG. 1, the method further includes forming a first prism layer 4 on a side of the wavelength conversion layer 3 away from the base substrate 10. The first prism layer is formed to collimate light entering the first prism layer.

In some embodiments and referring to FIG. 3, after forming the light source on the base substrate, the method further includes forming a reflective layer 12 having an opening 121, the opening 121 being in a one-to-one correspondence with the light source 11; and nesting the reflective layer 12 on a layer where the light source 11 is located through the opening 121 of the reflective layer 12. In some embodiments, the reflective layer is formed so that an orthographic projection of the opening in the reflective layer on the base substrate overlaps an orthographic projection of the light source on the base substrate, when the reflective layer is nested on the layer. In some embodiments, the reflective layer is formed so that an orthographic projection of the opening in the reflective layer on the base substrate covers an orthographic projection of the light source on the base substrate, when the reflective layer is nested on the layer. In some embodiments, the reflective layer is formed so that an orthographic projection of reflective layer on the base substrate does not overlap an orthographic projection of the light source on the base substrate when the reflective layer is nested on the layer, so that the light source can be provided within a corresponding opening.

In some embodiments and referring to FIGS. 6 and 7, the method further includes forming a plurality of lamp plates 1, and arranging the plurality of lamp plates 1 to form a surface light source, the wavelength selection layers 2 for the plurality of lamp plates 1 being integrally formed.

In some embodiments and referring to FIG. 5, the method further includes forming a diffuser layer 5 on a side of the light source 11 away from the base substrate 10, the diffuser layer 5 being formed to diffuse light having a predetermined color (e.g., blue light) emitted from the light source 11; and forming a second prism layer 6 on a side of the diffuser layer 5 away from the base substrate 10, the second prism layer 6 being formed to collimate the light having the predetermined color passing through the diffuser layer 5.

In some embodiments, each of the first prism layer and the second prism layer is formed to include a plurality of ridges, and the first prism layer and the second prism layer are formed such that an extending direction of the plurality of ridges of the first prism layer is orthogonal to an extending direction of the plurality of ridges of the second prism layer.

In some embodiments, the light source is a mini LED, and the light having the first wavelength is blue light.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present disclosure, and these variations and improvements shall also fall into the protection scope of the present disclosure.

What is claimed is:

1. A backlight, comprising:
   a lamp plate having a base substrate and a light source on the base substrate, the light source being configured to emit light having a first wavelength;
   a wavelength selection layer on a side of the light source away from the base substrate;
   a wavelength conversion layer on a side of the wavelength selection layer away from the base substrate;
   a first prism layer on a side of the wavelength conversion layer away from the base substrate and configured to collimate light entering the first prism layer;
   a diffuser layer on a side of the light source away from the base substrate and a side of the wavelength selection layer closer to the base substrate, and configured to diffuse light having a predetermined color emitted from the light source; and
   a second prism layer on a side of the diffuser layer away from the base substrate and the side of the wavelength selection layer closer to the base substrate, and configured to collimate the light having the predetermined color passing through the diffuser layer,
   wherein
   an extending direction of a ridge of the first prism layer is orthogonal to an extending direction of a ridge of the second prism layer;
   the wavelength conversion layer is configured to emit light having a second wavelength under excitation of the light having the first wavelength, and
   the wavelength selection layer is configured to transmit the light having the first wavelength through the wavelength selection layer and reflect the light having the second wavelength.

2. The backlight of claim 1, wherein the lamp plate further comprises a reflective layer on the base substrate,
   wherein the reflective layer has an opening in a one-to-one correspondence with the light source, and the reflective layer is nested on a layer where the light source is located through the opening of the reflective layer.

3. The backlight of claim 2, wherein an orthographic projection of the light source on the base substrate overlaps an orthographic projection of the opening on the base substrate.

4. The backlight of claim 1, further comprising a plurality of lamp plates including the lamp plate, and each of the plurality of lamp plates is the same as the lamp plate, the plurality of lamp plates are arranged in a plane and are arranged in form of an array;
   wherein an orthographic projection of the wavelength selection layer on the plane covers an orthographic projection of the plurality of lamp plates on the plane and an orthographic projection of a gap between adjacent lamp plates of the plurality of lamp plates on the plane.

5. The backlight of claim 4, wherein an orthographic projection of each of the wavelength conversion layer and the first prism layer on the plane covers the orthographic projection of the plurality of lamp plates on the plane and the orthographic projection of the gap between adjacent lamp plates of the plurality of lamp plates on the plane.

6. The backlight of claim 1, wherein the wavelength conversion layer is directly on and in contact with the wavelength selection layer.

7. The backlight of claim 1, wherein the light having the first wavelength comprises blue light; and the light having the second wavelength comprises red light and green light.

8. The backlight of claim 1, wherein the first wavelength is in a range of approximately 320 nm to approximately 480 nm; and the second wavelength is in a range of approximately 480 nm to approximately 800 nm.

9. The backlight of claim 1, wherein the wavelength conversion layer comprises a quantum dot or a fluorophor.

10. The backlight of claim 1, wherein the light source is a mini light emitting diode, and the light having the first wavelength is blue light.

11. A display apparatus, comprising the backlight of claim 1.

12. The backlight of claim 1, wherein the light having the first wavelength comprises blue light; and the light having the second wavelength comprises red light or green light.

13. A method for manufacturing a backlight, comprising:
    forming a base substrate and forming a light source on the base substrate, thereby forming a lamp plate, the light source being formed to emit light having a first wavelength;
    forming a wavelength selection layer on a side of the light source away from the base substrate;
    forming a wavelength conversion layer on a side of the wavelength selection layer away from the base substrate;
    forming a first prism layer on a side of the wavelength conversion layer away from the base substrate, the first prism layer being configured to collimate light entering the first prism layer;
    forming a diffuser layer on a side of the light source away from the base substrate and a side of the wavelength selection layer closer to the base substrate, and the diffuser layer being configured to diffuse light having a predetermined color emitted from the light source; and
    forming a second prism layer on a side of the diffuser layer away from the base substrate and the side of the wavelength selection layer closer to the base substrate, and the second prism layer being configured to collimate the light having the predetermined color passing through the diffuser layer,
    wherein
    the first prism layer and the second prism layer are formed so that an extending direction of a ridge of the first prism layer is orthogonal to an extending direction of a ridge of the second prism layer;

the wavelength conversion layer is formed to emit light having a second wavelength under excitation of the light having the first wavelength, and the wavelength selection layer is formed to transmit the light having the first wavelength through the wavelength selection layer and reflect the light having the second wavelength.

14. The method of claim 13, wherein the wavelength conversion layer is directly formed on the wavelength selection layer and formed to be in contact with the wavelength selection layer.

15. The method of claim 13, wherein the first wavelength is in a range of approximately 320 nm to approximately 480 nm; and the second wavelength is in a range of approximately 480 nm to approximately 800 nm.

16. The method of claim 13, wherein the wavelength conversion layer is formed to include a quantum dot or a fluorophor.

17. The method of claim 13, further comprising:

forming a plurality of lamp plates including the lamp plate, each of the plurality of lamp plates being formed the same as the lamp plate, the plurality of lamp plates being formed in a plane and being formed in form of an array;

wherein the wavelength selection layer is formed so that an orthographic projection of the wavelength selection layer on the plane covers an orthographic projection of the plurality of lamp plates on the plane and an orthographic projection of a gap between adjacent lamp plates of the plurality of lamp plates on the plane.

* * * * *